US007623430B2

(12) United States Patent
Suh (10) Patent No.: US 7,623,430 B2
(45) Date of Patent: Nov. 24, 2009

(54) HIGH-DENSITY MULTI-LAYER OPTICAL DISC AND METHOD FOR MANAGING LAYER FORMATTING THEREOF

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/499,663

(22) Filed: Aug. 7, 2006

(65) Prior Publication Data

US 2006/0280107 A1 Dec. 14, 2006

(51) Int. Cl.
G11B 7/00 (2006.01)

(52) U.S. Cl. .............. 369/53.22; 369/47.22; 369/94; 369/59.25

(58) Field of Classification Search ........... 369/53.22, 369/53.2, 47.22, 94
See application file for complete search history.

(56) References Cited

U.S. PATENT DOCUMENTS

| | | | | |
|---|---|---|---|---|
| 5,365,507 A | * | 11/1994 | Fuji et al. ........... | 369/47.5 |
| 5,414,451 A | * | 5/1995 | Sugiyama et al. ...... | 347/258 |
| 5,608,715 A | | 3/1997 | Yokogawa et al. | |
| 5,614,938 A | | 3/1997 | Sugiyama | |
| 5,768,221 A | | 6/1998 | Kasami et al. | |
| 6,052,347 A | | 4/2000 | Miyata | |
| 6,072,759 A | * | 6/2000 | Maeda et al. ........ | 369/59.25 |
| 6,101,162 A | | 8/2000 | Kim | |
| 6,172,955 B1 | | 1/2001 | Hashimoto | |
| 6,370,102 B1 | | 4/2002 | Mons et al. | |
| 6,404,713 B1 | | 6/2002 | Ueki | |
| 6,510,128 B2 | * | 1/2003 | Sekii .................. | 369/275.3 |
| 6,512,731 B1 | * | 1/2003 | Seo et al. .............. | 720/656 |
| 6,606,285 B1 | | 8/2003 | Ijtsma et al. | |
| 6,728,177 B2 | | 4/2004 | Seong et al. | |
| 6,728,186 B2 | | 4/2004 | Weijenbergh et al. | |
| 6,801,494 B2 | | 10/2004 | Ross | |
| 6,845,071 B2 | | 1/2005 | Shoji et al. | |
| 6,859,426 B1 | | 2/2005 | Ogawa et al. | |
| 6,917,572 B2 | | 7/2005 | Iida et al. | |
| 7,295,762 B2 | | 11/2007 | Sawabe et al. | |
| 7,376,058 B2 | | 5/2008 | Narumi et al. | |

(Continued)

FOREIGN PATENT DOCUMENTS

CN 1231473 10/1999

(Continued)

OTHER PUBLICATIONS

Korean Search Report, PCT/KR03/01116, Oct. 6, 2003.

(Continued)

*Primary Examiner*—Wayne R Young
*Assistant Examiner*—Van N Chow
(74) *Attorney, Agent, or Firm*—Harness, Dickey & Pierce (57) ABSTRACT

A high-density multi-layer optical disc and a method for managing layer formatting thereof. A high-density multi-layer optical disc such as a Blu-ray disc rewritable (BD-RE) dual layer includes management information, additionally recorded in a lead-in area, needed for identifying formatting status of a plurality of recording layers. After the management information is referred to, at least one unformatted recording layer is automatically formatted. Optionally, the unformatted recording layer is formatted on the basis of a formatting method selected by a user. The multiple recording layers formed on the high-density multi-layer optical disc can be conveniently and effectively formatted.

22 Claims, 9 Drawing Sheets

U.S. PATENT DOCUMENTS

| | | | |
|---|---|---|---|
| 2002/0021656 A1 | 2/2002 | Tsukagoshi et al. | |
| 2003/0048733 A1 | 3/2003 | Heemskerk et al. | |
| 2003/0063535 A1 | 4/2003 | Shoji et al. | |
| 2003/0072233 A1 | 4/2003 | Naoi et al. | |
| 2003/0081523 A1 | 5/2003 | Miyagawa et al. | |
| 2003/0137909 A1* | 7/2003 | Ito et al. | 369/47.14 |
| 2003/0169651 A1 | 9/2003 | Kobayashi | |
| 2003/0210627 A1* | 11/2003 | Ijtsma et al. | 369/53.18 |
| 2004/0085874 A1 | 5/2004 | Akiyama et al. | |

FOREIGN PATENT DOCUMENTS

| | | |
|---|---|---|
| CN | 1321980 | 11/2001 |
| CN | 1179353 | 12/2004 |
| EP | 768652 | 4/1997 |
| EP | 0 899 735 | 3/1999 |
| EP | 1 300 836 | 10/2002 |
| EP | 1 329 880 | 1/2003 |
| JP | 03-157816 | 7/1991 |
| JP | 03-290872 | 12/1991 |
| JP | 05-028644 | 2/1993 |
| JP | 05-101398 | 4/1993 |
| JP | 05-189765 | 7/1993 |
| JP | 08-096406 | 4/1996 |
| JP | 08-212561 | 8/1996 |
| JP | 09-231613 | 9/1997 |
| JP | 10-011755 | 1/1998 |
| JP | 10-241167 | 9/1998 |
| JP | 10-320926 | 12/1998 |
| JP | 11-025608 | 1/1999 |
| JP | 11-242565 | 9/1999 |
| JP | 2000-311346 | 11/2000 |
| JP | 2001-014808 | 1/2001 |
| JP | 13-086195 | 3/2001 |
| JP | 2001-143402 | 5/2001 |
| JP | 2001-209940 | 8/2001 |
| JP | 2002-050053 | 2/2002 |
| JP | 2002-352430 | 12/2002 |
| JP | 2003-030842 | 1/2003 |
| JP | 2001-052337 | 2/2003 |
| JP | 2003-178448 | 6/2003 |
| KR | 10-1997-0055600 | 10/1997 |
| WO | WO 96/19807 | 6/1996 |
| WO | WO 01/22416 | 3/2001 |
| WO | WO 03/019543 | 3/2003 |

OTHER PUBLICATIONS

Office Action for Chinese Patent Application No. 03800989.7 dated Feb. 10, 2006.

Office Action for Japanese Patent Application No. 2004-512132 dated Nov. 6, 2006.

Office Action for Japanese Patent Application No. 2006-194024 dated Oct. 25, 2007.

Office Action for U.S. Appl. No. 10/468,675 dated Jul. 7, 2009.

Search Report for European patent application No. 07017017.0 dated Mar. 16, 2009.

ECMA: Standardizing Information and Communication Systems: "Standard ECMA-272, $2^{nd}$ edition: 120 mm DVD Rewritable Disk (DVD-RAM)" Standard ECMA-272, XX, XX, No. 272, Jun. 1, 1999, pp. 43-55, XP002186767.

* cited by examiner (CONVENTIONAL ART)

HIGH-DENSITY MULTI-LAYER OPTICAL DISC AND METHOD FOR MANAGING LAYER FORMATTING THEREOF

PRIORITY STATEMENT

This application claims the priority under 35 U.S.C. § 120 upon U.S. patent application Ser. No. 10/485,914 (parent application), filed on Oct. 8, 2004, the disclosure of which is hereby incorporated by reference in its entirety.

TECHNICAL FIELD

The present invention relates to a high-density multi-layer optical disc on which multiple layers are formed and a method for managing layer formatting thereof.

BACKGROUND ART

As standardization of a high-density rewritable optical disc, e.g., a Blu-ray disc rewritable (BD-RE), capable of storing high-quality video and audio is rapidly progressed, it is expected that related products will be developed, commercialized and supplied.

Figure 1:
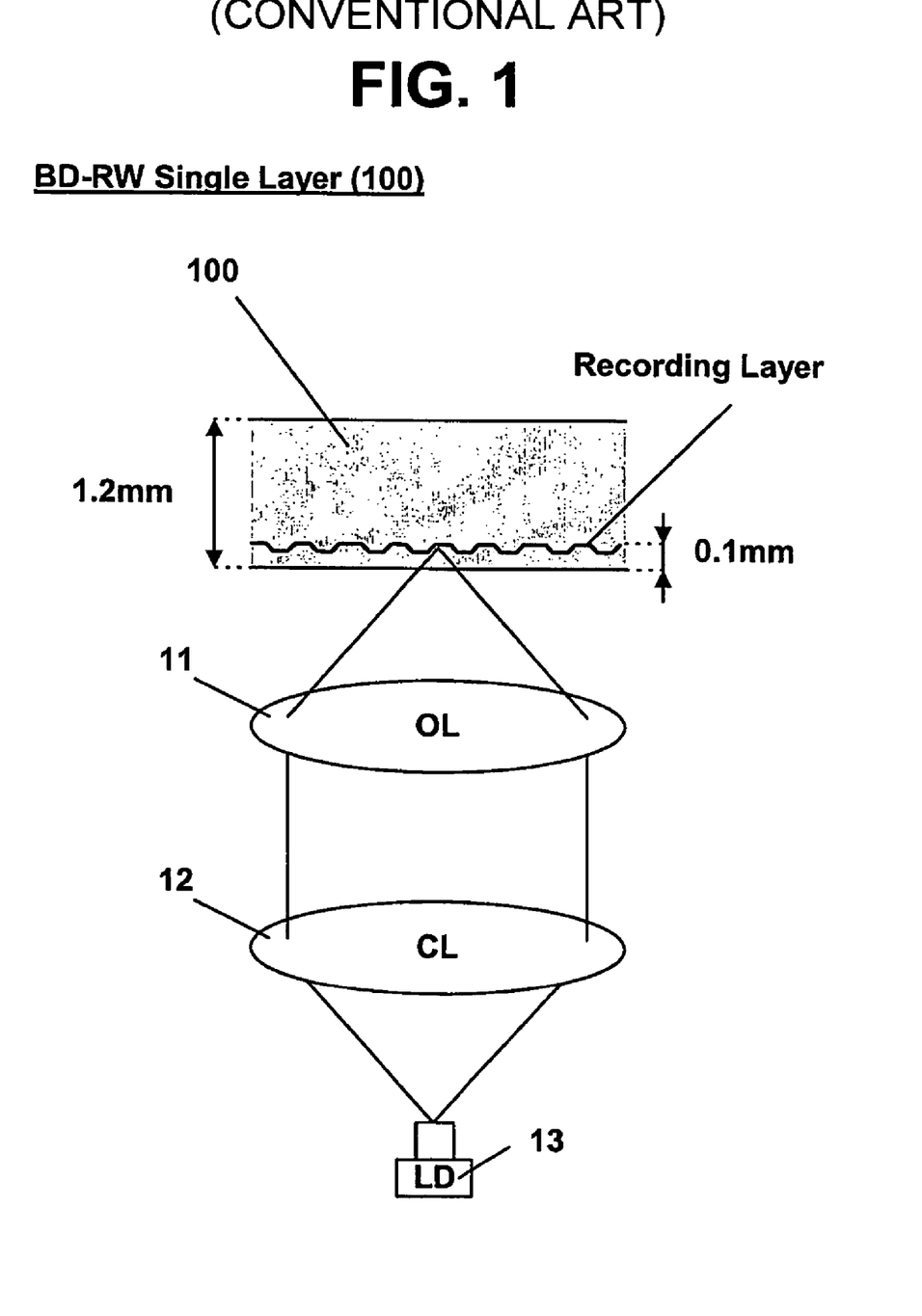
FIG. 1 is a view illustrating the structure of a conventional Blu-ray disc rewritable (BD-RE)

A conventional BD-RE single layer 100 is shown in FIG. 1. As shown in FIG. 1, there is a distance of approximately 0.1 mm between a recording layer and the surface of a transparent film being arranged between the recording layer and an objective lens (OL) 11 of an optical pick-up.

Figure 2:
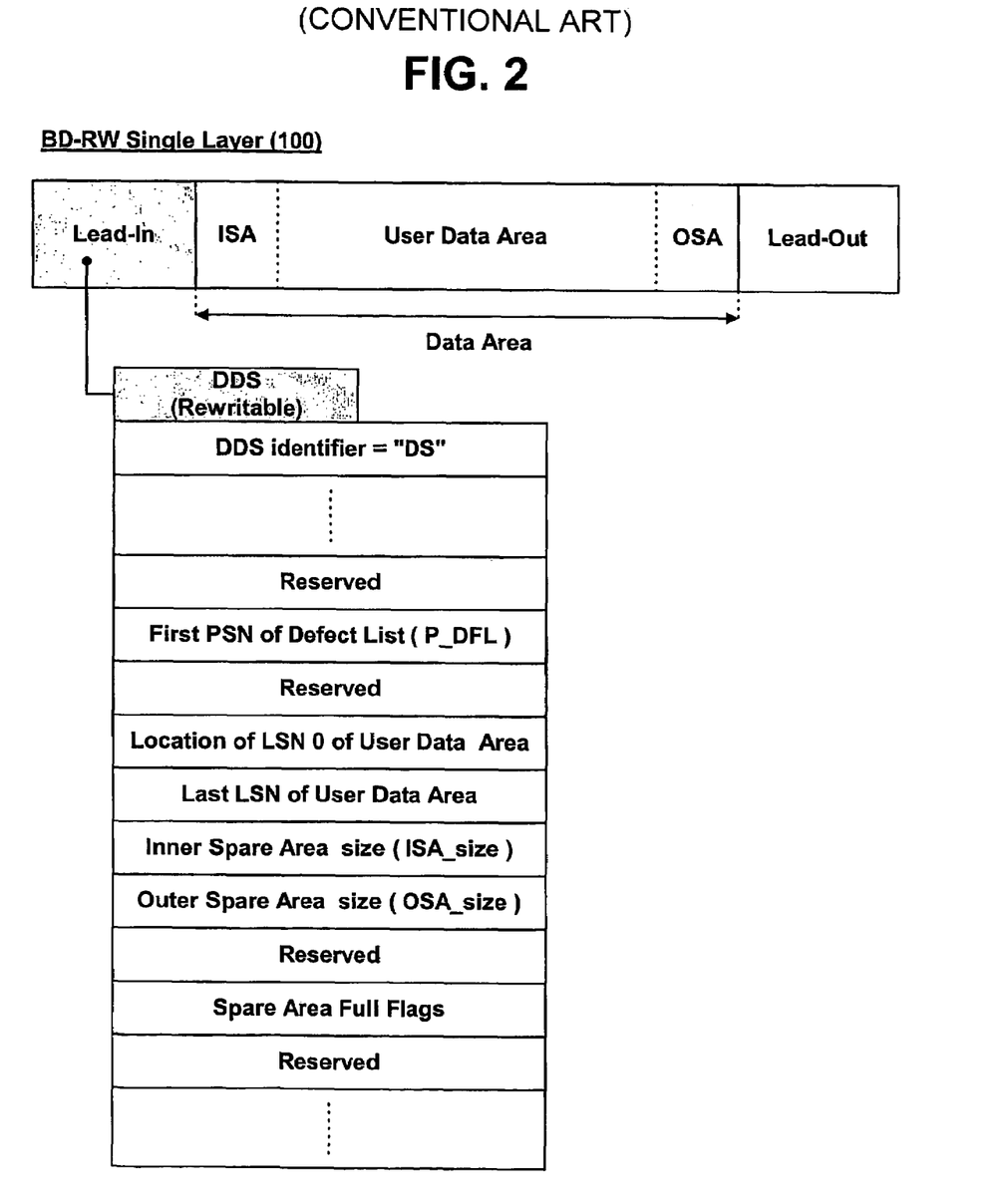
FIG. 2 is a table illustrating disc definition structure (DDS) information recorded and managed in a lead-in area of the conventional BD-RE.

When an optical disc apparatus for reading and reproducing data recorded on the recording layer of the BD-RE single layer 100 or recording data thereon determines that a defect is detected on the layer 100 while performing a data recording operation, the optical disc apparatus records the data in an inner spare area (ISA) or outer spare area (OSA) separately assigned to a data area as shown in FIG. 2, in place of a data area.

Further, the optical disc apparatus generates a defect list (DFL) entry needed for identifying a cluster associated with a recording unit block (RUB) recorded in the spare area in place of a data area, and performs a recording and management operation for the generated DFL entry.

As shown in FIG. 2, management information associated with the spare areas and defects is contained and recorded in a field of rewritable disc definition structure (DDS) information of a lead-in area. The DDS information includes information items associated with the first physical sector number (PSN) of the DFL (P_DFL) a location of a logical sector number (LSN) 0 of a user data area, the last LSN of the user data area, a size of the ISA (ISA size), a size of the OSA (OSA size), spare area full flags indicating whether or not the respective spare areas are full, etc.

As described above, when the defect is detected in the data area while the optical disc apparatus records data in the data area, the optical disc apparatus searches for the spare area full flags contained and recorded in the DDS information field, selects the ISA or OSA in which the data can be recorded, and performs a sequence of data recording operations for recording the data in the selected spare area.

The recording layer of the BD-RE single layer 100 must be previously formatted so that the data can be recorded on the recording layer. The layer formatting method includes a general formatting method requiring a long formatting time, a recently proposed background formatting method, etc. Here, the background formatting method is that a formatting operation is performed automatically when or whenever the recording or reproducing device is idle, and stores information associated with the location of a formatted area until a time point when a data recording request is received from a user, thereby enabling the data, corresponding to the data recording request, to be recorded in the formatted area until the time point.

Figure 3:
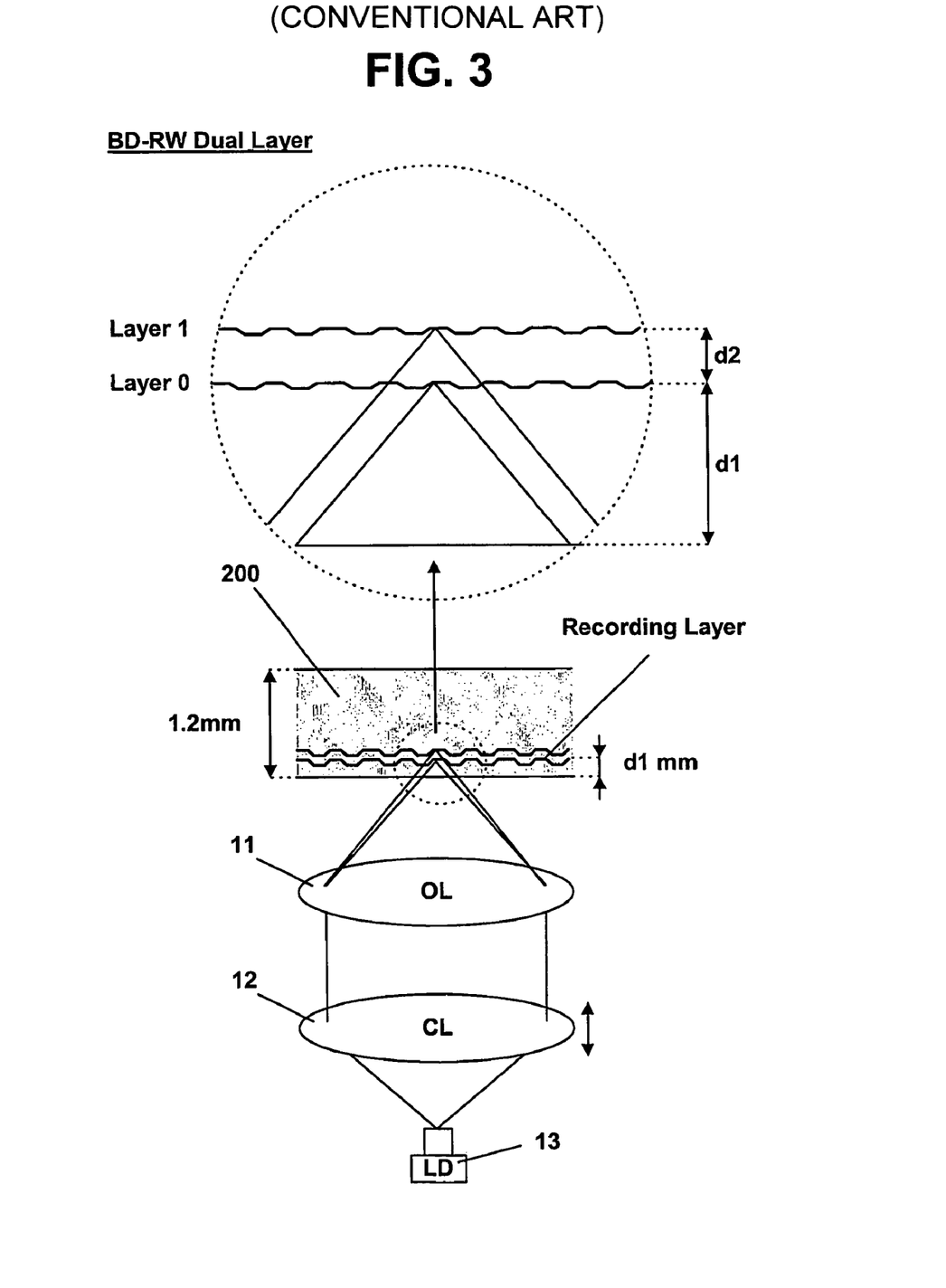
FIG. 3 is a view illustrating the structure of a high-density dual-layer optical disc.

A high-density multi-layer optical disc, i.e., a BD-RE dual layer, capable of recording twice as much video and audio data as the BD-RE single layer, has been developed. As shown in FIG. 3, there is a distance d2 between the first recording layer (Layer 0) and the second recording layer (Layer 1) formed in the BD-RE dual layer 200. The first and second recording layers are formed at a location, within the BD-RE dual layer 200, having a bias toward the OL 11 of the optical pick-up.

The ISA and OSA are separately assigned to each of data areas associated with the first and second recording layers of the BD-RE dual layer 200. The first and second recording layers can be linked to each other so that large-capacity data can be recorded. However, there is not yet provided a method for effectively formatting the first and second recording layers provided in the BD-RE dual layer 200.

SUMMARY

At least one embodiment of the present invention provides a high-density multi-layer optical disc such as a Blu-ray disc rewritable (BD-RE) dual layer and a method for managing layer formatting thereof, which can record and manage management information needed for identifying formatting status associated with multiple recording layers formed on the disc and automatically perform a formatting operation of an unformatted recording layer, or perform the formatting operation in response to a user's selection.

At least one embodiment of the present invention provides a multi-layer optical disc comprising: a plurality of recording layers formed thereon; and a management information area formed in at least one of the plurality of recording layers, wherein the management information area includes management information required to record or reproduce data, the management information includes a respective status information identifying formatting status of each recording layer, and a respective position information associated with a position to be formatted for each recording layer.

At least one embodiment of the present invention provides a method of managing a formatting operation of a multi-layer optical disc, the method comprising: (a) reading management information from a specified area of the multi-layer optical disc, wherein the management information includes status information and position information for respective recording layers, the status information indicating a formatting status of corresponding recording layer and the position information associated with a position to be formatted in a corresponding recording layer; (b) determining a recording layer and a position to be formatted based on the read management information; and (c) performing a formatting operation based on a result of step (b).

At least one embodiment of the present invention provides an apparatus for managing a formatting operation of a multi-layer optical disc, the apparatus comprising: (a) a reading/recording unit reading management information from a specified area located at one recording layer of the multi-layer optical disc, wherein the management information includes status information and position information for respective recording layers, the status information indicating a formatting status of corresponding recording layer and the position information associated with a position to be formatted in a corresponding recording layer; and (b) a controller determining a recording layer and a position to be formatted based on the read management information, controlling a formatting operation by background formatting method from the position to be formatted in the corresponding recording layer as a result of the determination.

BRIEF DESCRIPTION OF DRAWINGS

The accompanying drawings, which are included to provide a further understanding of the invention, illustrate the preferred embodiments of the invention, and together with the description, serve to explain the principles of the present invention.

Features, elements, and aspects of the invention that are referenced by the same numerals in different figures represent the same, equivalent, or similar features, elements, or aspects in accordance with one or more embodiments.

DETAILED DESCRIPTION OF EXAMPLE EMBODIMENTS

A high-density multi-layer optical disc and a method for managing layer formatting thereof in accordance with preferred embodiments of the present invention will be described in detail with reference to the annexed drawings.

Figure 4:
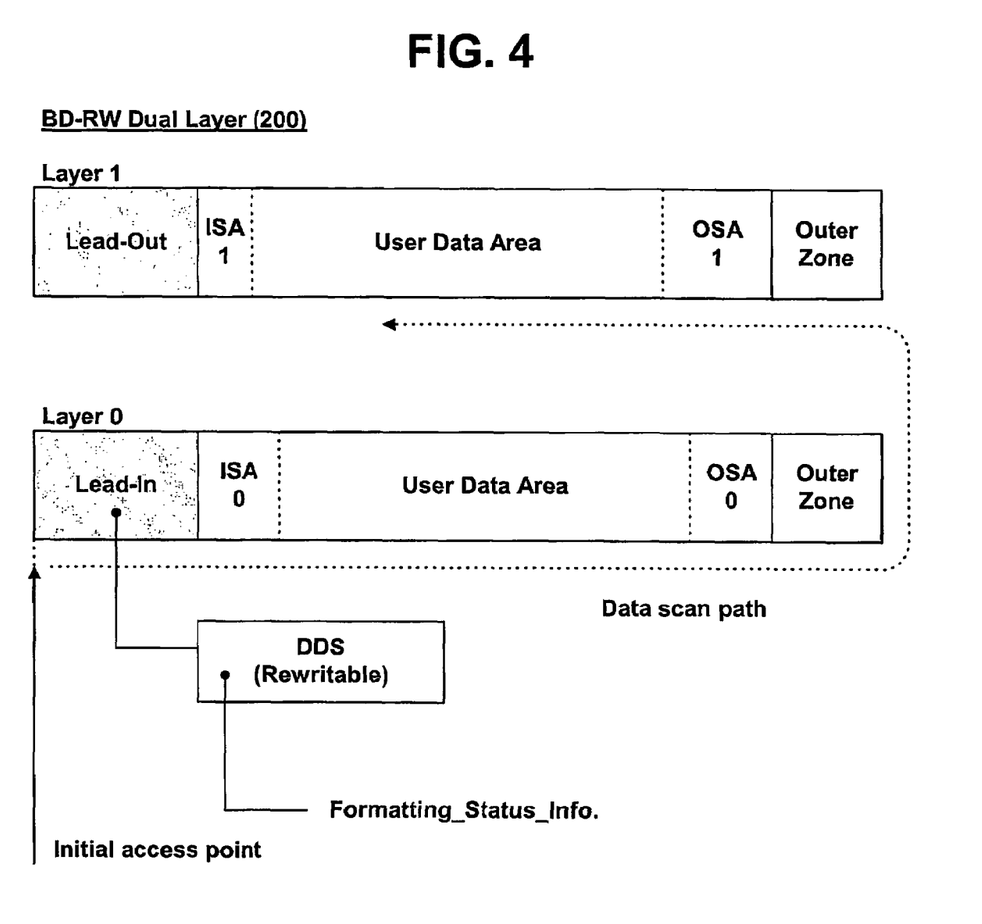
FIG. 4 is a view illustrating a state where disc definition structure (DDS) information is contained in a lead-in area of the high-density dual-layer optical disc in accordance with the present invention.

FIG. 4 is a view illustrating a state where disc definition structure (DDS) information is contained in a lead-in area of a high-density dual-layer optical disc in accordance with the present invention.

As shown in FIG. 4, the lead-in area is assigned to the first recording layer (Layer 0) and a lead-out area is assigned to the second recording layer (Layer 1) in a high-density multi-layer optical disc, e.g., a Blu-ray disc rewritable (BD-RE) dual layer 200, in accordance with the present invention. The first inner spare area (ISA) (ISA0) and first outer spare area (OSA0) 1 are separately assigned to a data area for the first recording layer. The second ISA (ISA1) and second OSA (OSA1) are separately assigned to a data area for the second recording layer.

Management information needed for managing a plurality of spare areas separately assigned to the data area for each recording layer and defect management address (DMA) information needed for managing a defect are rewritable disc definition structure (DDS) information. The rewritable DDS information can be recorded and managed in the lead-in area of the first recording layer. The DDS information can include formatting status information needed for identifying the formatting status of the first and second recording layers. Also, the DDS information can include the last verified address (LVA) pointer for each layer. The LVA pointer can specify the first physical sector number (PSN) for the last cluster that has been formatted by a formatting operation. This pointers are only valid when the disc has been partially formatted and when a formatting operation is in progress.

Figure 5:
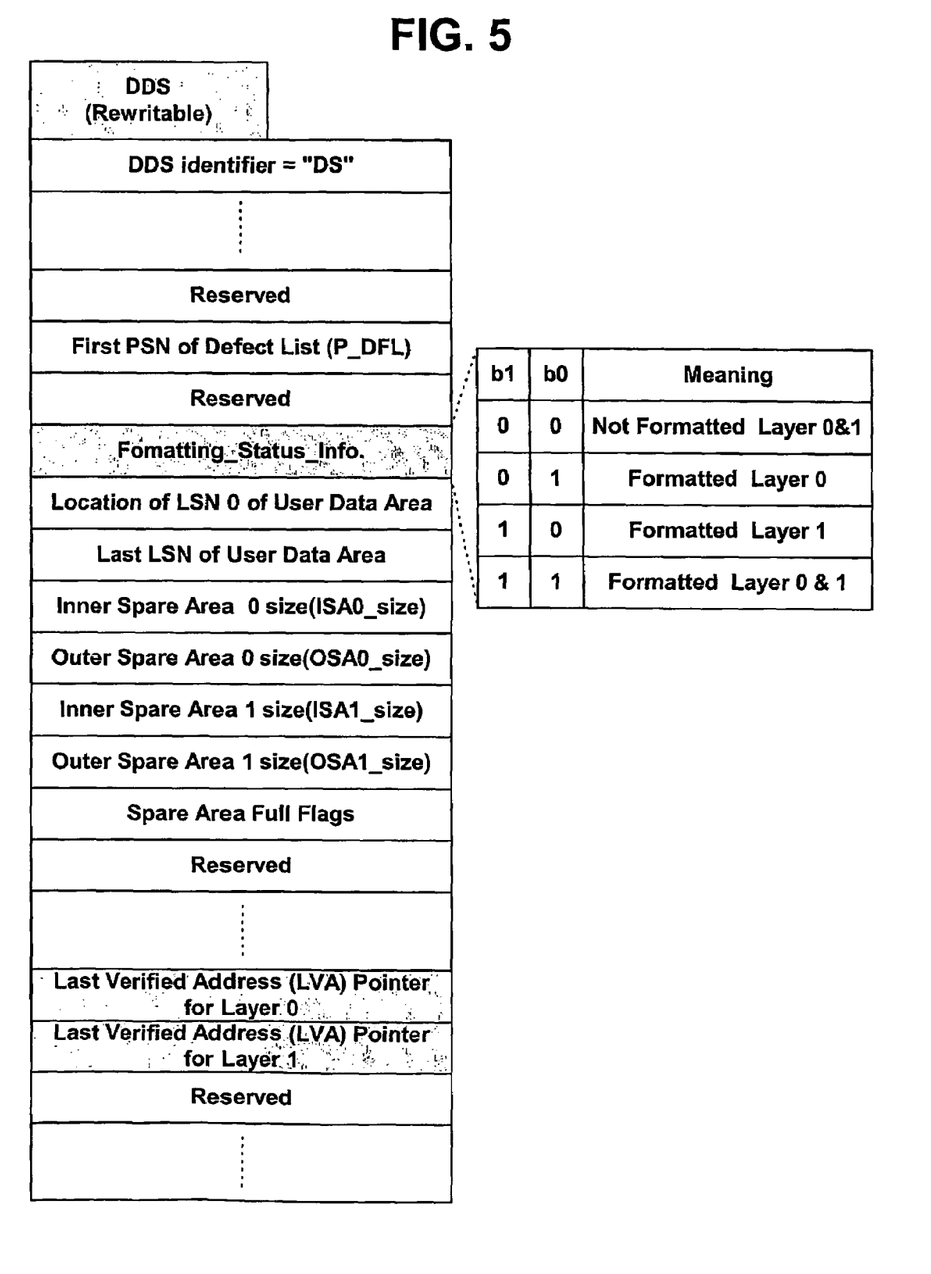
FIG. 5 is a table illustrating the DDS information recorded and managed in the lead-in area of the high-density dual-layer optical disc in accordance with the present invention.

FIG. 5 is a table illustrating the DDS information recorded and managed in the lead-in area of the high-density dual-layer optical disc in accordance with the present invention.

As shown in FIG. 5, the DDS information includes information items associated with the first physical sector number (PSN) of a defect list (DFL) (P_DFL), a location of a logical sector number (LSN) 0 of a user data area, the last LSN of the user data area, a size of the first ISA (ISA0_size) for the first recording layer, a size of the second ISA (ISA1_size) for the second recording layer, a size of the first OSA (OSA0_size) for the first recording layer, a size of the second OSA (OSA1_size) for the second recording layer, spare area full flags indicating whether or not the respective spare areas are full, the formatting status information (Formatting_Status_Info.) having the predetermined number of bits, last verified address (LVA) pointer for the first recording layer, and last verified address (LVA) pointer for the second recording layer.

For example, where Formatting_Status_Info.="00", the 2-bit formatting status information indicates the status in which the first and second recording layers are not formatted. Where Formatting_Status_Info.="01", the 2-bit formatting status information indicates the status in which only the first recording layer is formatted. Where Formatting_Status_Info.="10", the 2-bit formatting status information indicates the status in which only the second recording layer is formatted. Where Formatting_Status_Info. "11", the 2-bit formatting status information indicates the status in which the first and second recording layers are formatted.

A recording layer indicated as unformatted by Formatting_Status_Info. can be a partially formatted layer. And if a recording layer has been partially formatted, the first physical sector number (PSN) of the last cluster that has been formatted can be written in the last verified address (LVA) pointer for the recording layer. So a formatting operation for a partially formatted recording layer could be continued from the PSN of the LVA pointer for the partially formatted recording layer.

The optical disc apparatus searches for and confirms the formatting status information. The optical disc apparatus determines whether the respective recording layers of the BD-RE dual layer 200 loaded in the apparatus are formatted to record the data. According to a result of the determination, the optical disc apparatus automatically formats an unformatted recording layer using a predetermined formatting method, e.g., a background formatting method, or performs a series of formatting operations using a formatting method selected or designated by the user. The above-described procedure will be described in detail.

Figure 6:
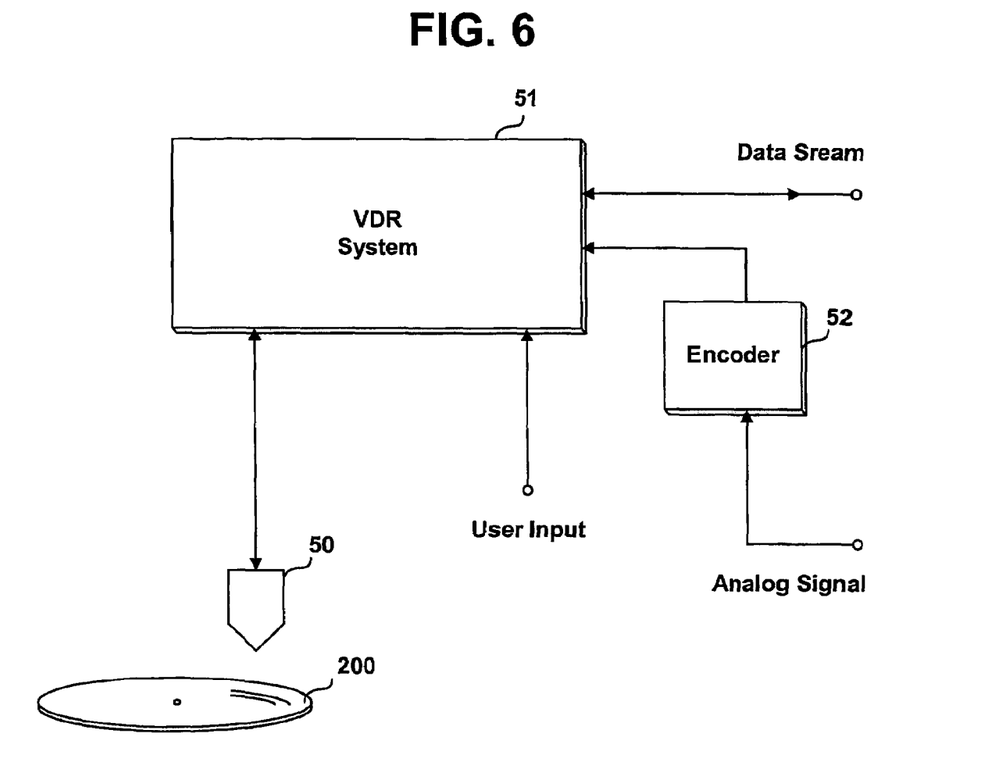
FIG. 6 is a view illustrating the configuration of an optical disc apparatus to which a method for managing layer formatting of a high-density multi-layer optical disc is applied in accordance with the present invention.

FIG. 6 is a view illustrating a configuration of the optical disc apparatus to which the method for managing layer formatting of a high-density multi-layer optical disc is applied in accordance with the present invention. For example, an optical disc apparatus such as a video disc recorder (VDR) for recording or reproducing data of a BD-RE dual layer includes an optical pick-up 50 for reading data recorded on a high-density multi-layer optical disc 200 such as the BD-RE dual layer or recording a data stream corresponding to a processed signal; a VDR system 51 for performing a signal processing operation so that a signal of the data read by the optical pick-up 50 can be reproduced or converting an externally inputted data stream into a data stream appropriate for recording; and an encoder 52 for encoding an externally inputted analog signal and outputting the encoded analog signal to the VDR system 51.

Figure 7A:
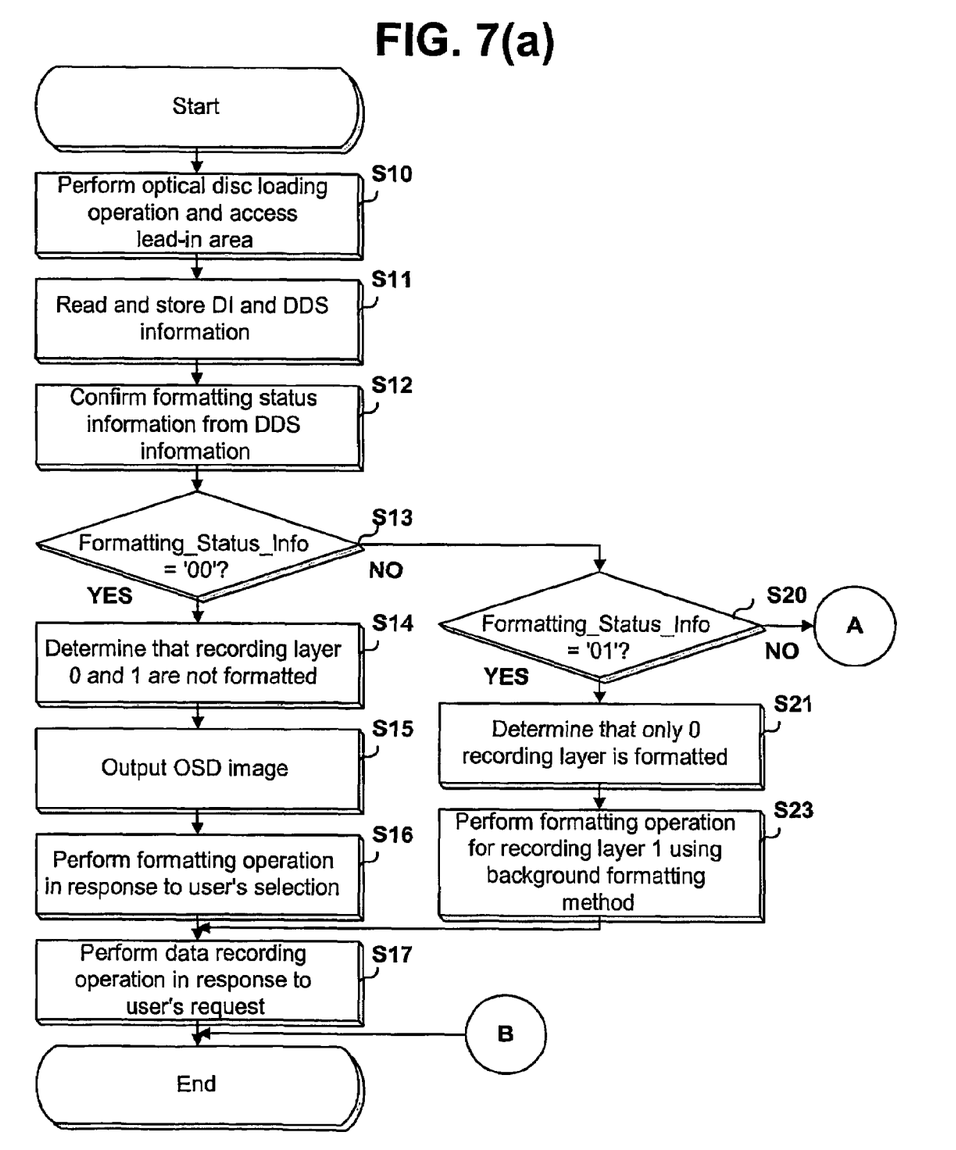
FIGS. 7A and 7B are flowcharts illustrating the method for managing layer formatting of a high-density multi-layer optical disc in accordance with the present invention.
Figure 7B:
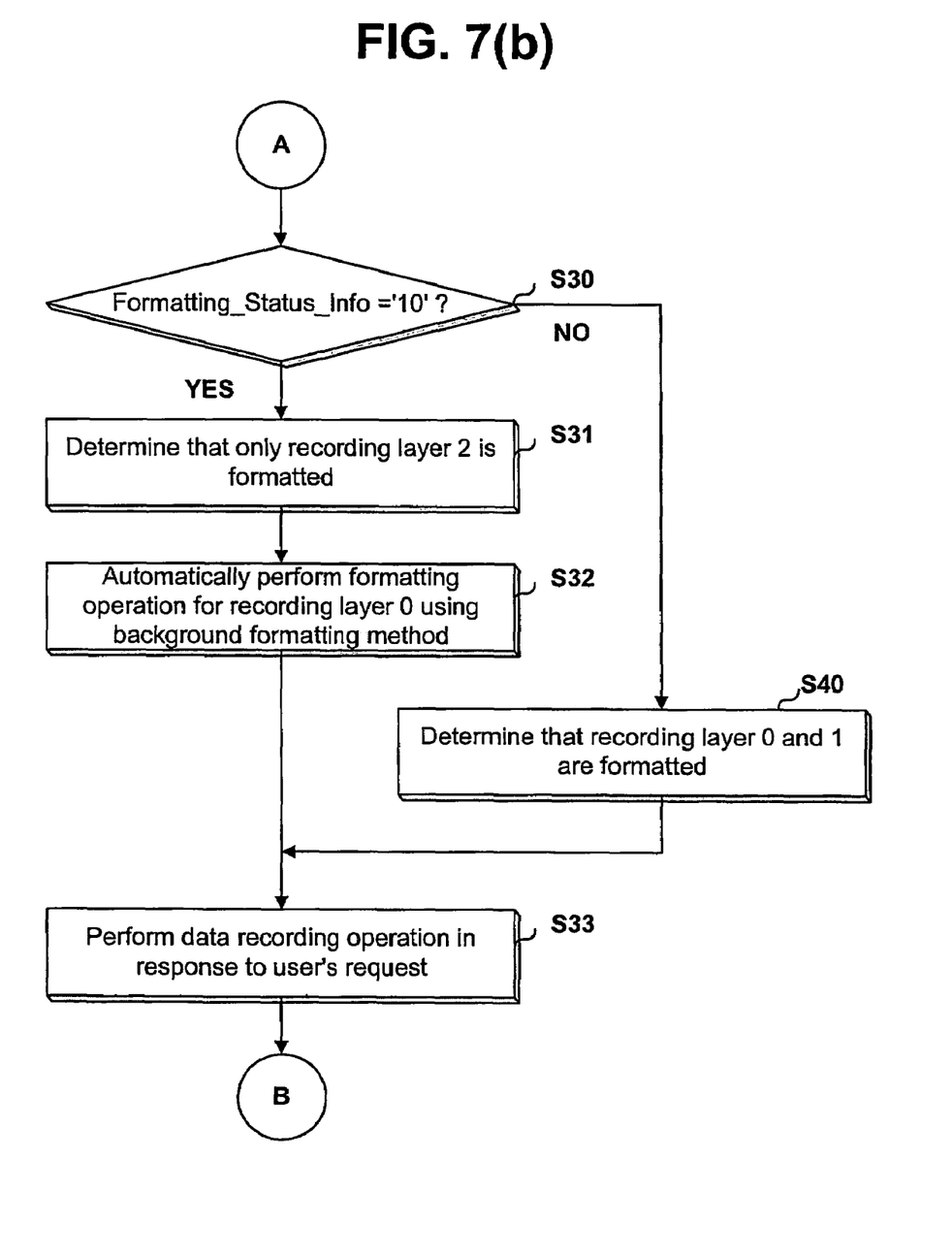

FIGS. 7A and 7B are flowcharts illustrating the method for managing layer formatting of a high-density multi-layer optical disc in accordance with the present invention.

As shown in FIGS. 7A and 7B, where the high-density multi-layer optical disc, e.g., the BD-RE dual layer 200, is inserted and loaded in the VDR system 51 of the optical disc apparatus, a sequence of optical disc loading operations is performed and a lead-in area of the optical disc is accessed at step S10.

Then, the VDR system 51 reads disc information (DI) and disc definition structure (DDS) information recorded in the lead-in area and then stores the read information in an internal memory (not shown) provided in the optical disc apparatus at step S11. At this time, the DDS information containing formatting-status information is stored in the memory at the above step S11. Then, the VDR system 51 confirms the formatting status information at step S12. Where the formatting status information (Formatting_Status_Info.)="00", the VDR system 51 determines that the first and second recording layers of the BD-RE dual layer 200 are not formatted at step S14.

Figure 8:
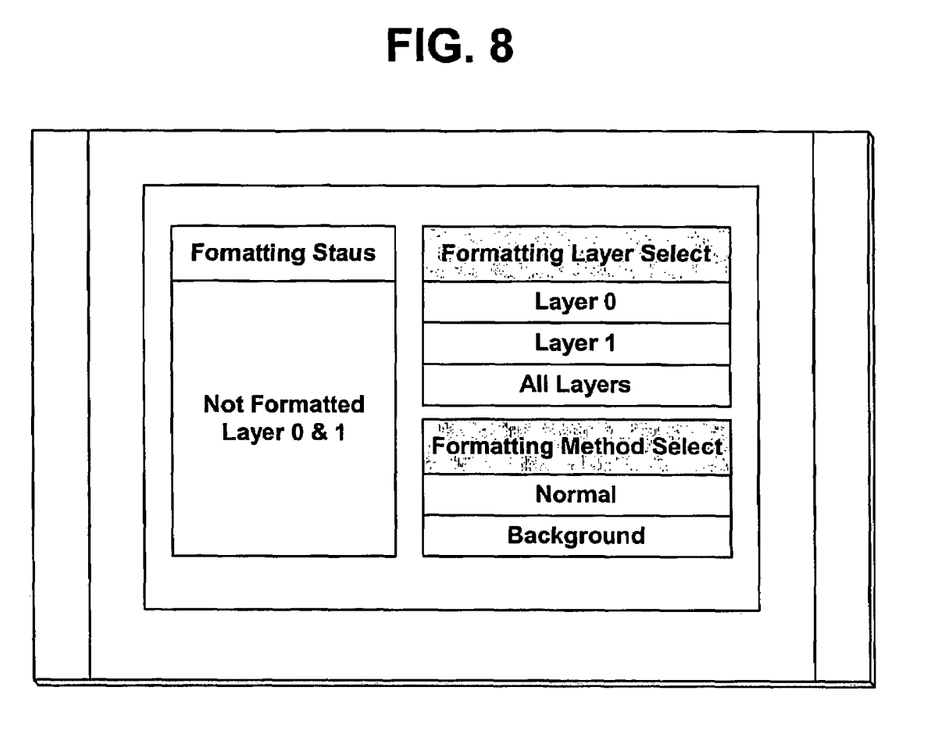
FIG. 8 is a view illustrating an image of an on-screen display (OSD) displayed by the method for managing layer formatting of a high-density multi-layer optical disc in accordance with the present invention.

For example, an image of an on-screen display (OSD) containing a message indicating that the first and second recording layers are not formatted, a selection menu for allowing the user to select the first recording layer and/or the second recording layer to be formatted, etc., is displayed through the screen of a television coupled to the optical disc apparatus at step S15.

The VDR system 51 performs a formatting operation for the first recording layer and/or the second recording layer selected by the user at step S16. At this time, the formatting operation is based on a general formatting method or a background formatting method.

Then, the VDR system 51 can appropriately perform a data recording operation for recording data on the formatted first recording layer and/or second recording layer in response to the user's request at step S17.

On the other hand, where the formatting status information (Formatting_Status_Info.)="01" at step S20, the VDR system 51 determines that only the first recording layer of the BD-RE dual layer 200 is formatted at step S21.

Then, the VDR system 51 automatically performs the formatting operation for the unformatted second recording layer using the predetermined background formatting method at step S23.

Then, the VDR system 51 can appropriately perform the data recording operation for recording the data on the formatted first or second recording layer in response to the user's request at the above step S17.

On the other hand, where the formatting status information (Formatting_Status_Info.)="10" at step S30, the VDR system 51 determines that only the second recording layer of the BD-RE dual layer 200 is formatted at step S31. Then, the VDR system 51 automatically performs the formatting operation for the unformatted first recording layer using the predetermined background formatting method at step S32. Then, the VDR system 51 appropriately performs the data recording operation for recording the data on the formatted first or second recording in response to the user's-request layer at step S33.

On the other hand, where the formatting status information (Formatting_Status_Info.)="11", the VDR system 51 determines that the first and second recording layers of the BD-RE dual layer 200 are formatted at step S40. Then, the VDR system 51 can perform the data recording operation in response to the user's request without additionally performing the formatting operation at the above step S33.

Meanwhile, a partially formatted recoding layer indicated as unformatted by the Formatting_Status_Info. can be formatted from the PSN of the LVA pointer for the partially formatted recording layer. The formatting operation for the partially formatted recording layers can be continued from the PSN of the LVA pointer for the partially formatted recording layers at the above steps S16, S23, and S32.

As apparent from the above description, the present invention provides a high-density multi-layer optical disc and a method for managing layer formatting thereof, which can conveniently and effectively format multiple recording layers formed on the high-density multi-layer optical disc.

The preferred embodiments of the present invention have been disclosed for illustrative purposes. Those skilled in the art will appreciate that various modifications, additions and substitutions are possible, without departing from the scope and spirit of the invention as disclosed in the accompanying claims.

What is claimed is:

1. A multi-layer optical disc, comprising:
a plurality of recording layers formed thereon; and
a management information area formed in at least one of the plurality of recording layers, wherein the management information area includes management information required to record or reproduce data, the management information includes status information identifying formatting status of each recording layer, and position information associated with last formatted positions for each recording layer.

2. The multi-layer optical disc of claim 1, wherein the management information is recorded in the lead-in area, the lead-in area being only located at a specific recording layer of the multi-layers.

3. The multi-layer optical disc of claim 1, wherein the position information includes a first physical sector number of the last data unit.

4. The multi-layer optical disc of claim 1, wherein each status information indicates the formatting status of first recording layer and the formatting status of second recording layer, if the multi-layer optical disc is a dual-layer optical disc, wherein the formatting status specifies whether the corresponding recording layer has been formatted.

5. The multi-layer optical disc of claim 4, wherein the formatting status specifies whether the corresponding recording layer has been formatted partially by associating with the position information.

6. The multi-layer optical disc of claim 1, wherein said position information has an available value when the status information indicates that the corresponding layer has been partially formatted.

7. The multi-layer optical disc of claim 1, wherein the management information including the status information and the position information is only included in a first recording layer but not included in other recording layers different from the first recording layer.

8. A method of managing a formatting operation of a multi-layer optical disc, the method comprising:

(a) reading management information from a specified area of the multi-layer optical disc, wherein the management information includes status information and position information for respective recording layers, the status information indicating a formatting status of a corresponding recording layer and the position information including a last formatted position in a corresponding recording layer;

(b) determining a recording layer and a position to be formatted based on the read management information; and (c) performing a formatting operation based on a result of step (b).

9. The method of claim 8, wherein the step (b) determines a corresponding recording layer unformatted based on the status information.

10. The method of claim 8, wherein the step (b) determines all recording layers to be formatted if all recording layers are unformatted based on the status information.

11. The method of claim 8, wherein the step (b) determines a corresponding recording layer formatted partially based on the status information and a position to be formatted in the corresponding recording layer based on the position information.

12. The method of claim 11, wherein the step (c) performs the formatting operation by background formatting method from the position to be formatted in the corresponding recording layer as a result of the step (b).

13. The method of claim 12, further comprising:

(d) recording user data at the formatted area of the corresponding recording layer.

14. The method of claim 8, wherein said position information has an available value when the status information indicates that the corresponding layer has been partially formatted.

15. The method of claim 8, wherein the management information including the status information and the position information for respective recording layers is only included in a first recording layer but not included in other layers different from the first recording layer, and the step (a) reads the management information from the first recording layer.

16. An apparatus for managing a formatting operation of a multi-layer optical disc, the apparatus comprising:

(a) a reading/recording unit configured to read management information from a specified area located at one recording layer of the multi-layer optical disc, wherein the management information includes status information and position information for respective recording layers, the status information indicating a formatting status of corresponding recording layer and the position information including a last formatted position in a corresponding recording layer; and (b) a controller configured to determine a recording layer and a position to be formatted based on the read management information, and control the read/recording unit to perform a formatting operation by background formatting method from the position to be formatted in the corresponding recording layer as a result of the determination.

17. The apparatus of claim 16, wherein the controller is further configured to determine a corresponding recording layer unformatted based on the status information.

18. The apparatus of claim 16, wherein the controller is further configured to determine all recording layers to be formatted if all recording layers are unformatted based on the status information.

19. The apparatus of claim 16, wherein the controller is further configured to determine a corresponding recording layer unformatted partially based on the status information and a position to be formatted in the corresponding recording layer based on the position information.

20. The apparatus of claim 16, wherein the controller is further configured to control the reading/recording unit to record user data at the formatted area of the corresponding recording layer.

21. The apparatus of claim 16, wherein said position information has an available value when the status information indicates that the corresponding layer has been partially formatted.

22. The apparatus of claim 16, wherein the management information including the status information and the position information for respective recording layers is only included in a first recording layer but not included in other layers different from the first recording layer, and the reading/recording unit is configured to read the management information from the first recording layer.

* * * * *

UNITED STATES PATENT AND TRADEMARK OFFICE
CERTIFICATE OF CORRECTION

| | | |
|---|---|---|
| PATENT NO. | : 7,623,430 B2 | Page 1 of 1 |
| APPLICATION NO. | : 11/499663 | |
| DATED | : November 24, 2009 | |
| INVENTOR(S) | : Sang Woon Suh | |

It is certified that error appears in the above-identified patent and that said Letters Patent is hereby corrected as shown below:

On the Title page insert the following:

Related U.S. Application Data

(63) Continuation of application No. 10/485,914, filed on Oct. 8, 2004, now Pat. No. 7,623,428

Foreign Application Priority Data

(30) June 8, 2002 (KR).......10-2002-0032183
June 7, 2003 (KR)........PCT/KR2003/001116

Signed and Sealed this

Thirteenth Day of July, 2010

David J. Kappos
*Director of the United States Patent and Trademark Office*